(12) United States Patent
Lopez

(10) Patent No.: US 6,560,096 B1
(45) Date of Patent: May 6, 2003

(54) MULTIPLE SERVER CONFIGURATION WITHIN A SINGLE SERVER HOUSING

(75) Inventor: Robert Lopez, San Jose, CA (US)

(73) Assignee: Loudcloud, Inc., Sunnyvale, CA (US)

( * ) Notice: Subject to any disclaimer, the term of this patent is extended or adjusted under 35 U.S.C. 154(b) by 102 days.

(21) Appl. No.: 09/699,683

(22) Filed: Oct. 31, 2000

(51) Int. Cl.[7] .............................................. H05K 7/20
(52) U.S. Cl. ..................... 361/685; 165/80.3; 174/16.3; 713/200; 361/687
(58) Field of Search ................................ 361/683, 685, 361/687, 690, 695, 752; 165/80.3; 174/16.3; 713/200

(56) References Cited

U.S. PATENT DOCUMENTS 6,282,653 B1 * 8/2001 Berstis et al. ................. 713/200
6,324,056 B1 * 11/2001 Breier et al. ................. 361/687
6,327,152 B1 * 12/2001 Saye ........................... 361/732
6,356,438 B1 * 3/2002 Leman et al. ................ 361/683

* cited by examiner

Primary Examiner—Darren Schuberg
Assistant Examiner—Hung Van Duong
(74) Attorney, Agent, or Firm—Burns, Doane, Swecker & Mathis, L.L.P.

(57) ABSTRACT

The present invention is directed to a technique whereby multiple servers may be contained within single server chassis or housing. This space saving technique is used to increase the server-to-space ratio for purposes of data warehousing facility cost minimization, and to reduce a maximum amount of space required by a large number of servers. Multiple improvements have been made to each of the servers contained within a single server housing to allow for proper functionality of each of the servers contained within a housing. Additionally, the multiple servers of the present invention have many improvements that allow for remote monitoring, maintenance, and reconfiguration by a remote user or system administrator.

16 Claims, 4 Drawing Sheets

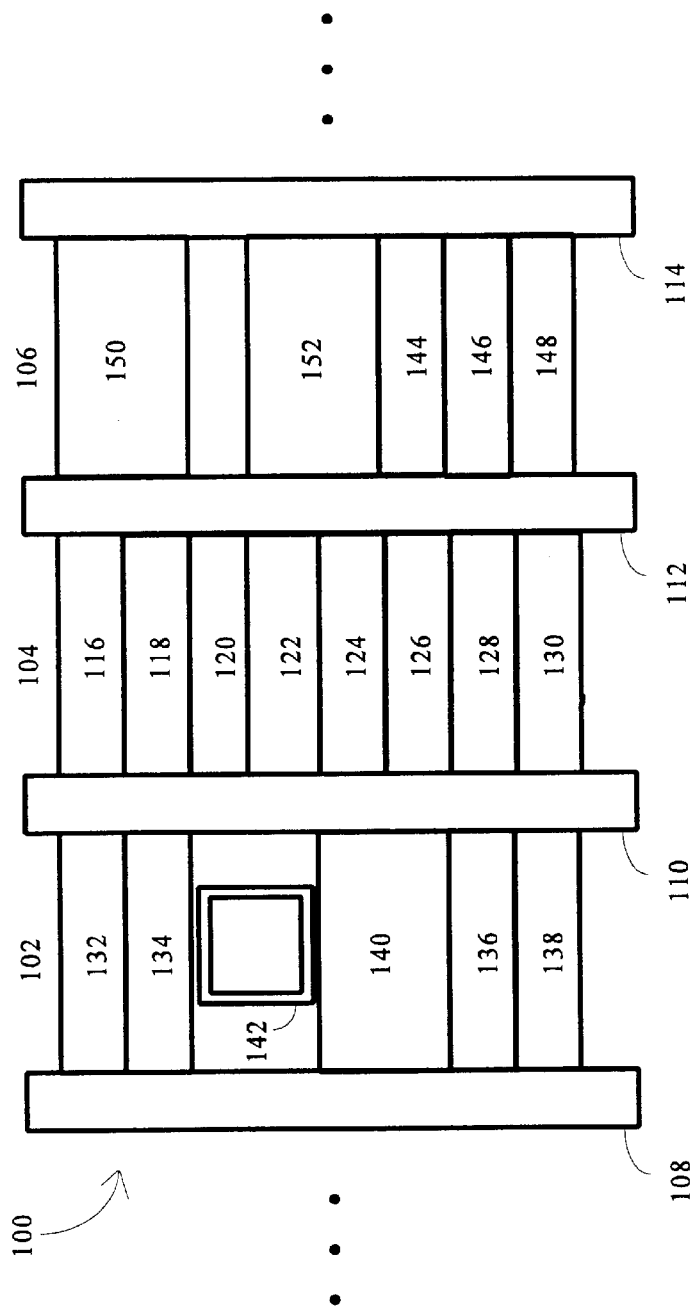
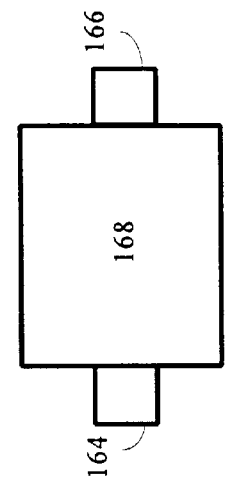
FIGURE 1A
FIGURE 1B
FIGURE 1C

MULTIPLE SERVER CONFIGURATION WITHIN A SINGLE SERVER HOUSING

FIELD OF THE INVENTION

The present invention relates to computer networking technology. More specifically, the present invention relates to the configuration of multiple servers within a single server housing.

BACKGROUND OF THE INVENTION

As the popularity of computer networking increases, the need for application servers has increased dramatically. Often, these network application servers are centrally located in either a data warehousing facility, an internet service provider (ISP) location, or the like.

Regardless of the location in which the network application servers are maintained, the need for minimizing the size of the servers to maximize the server-per-area ratio is universal. For example, if servers are maintained at a data warehousing facility, where space is leased for housing the network application servers, it is desirable to minimize the space required for the maximum number of servers. This allows one to service the maximum number of clients by using a high number of servers while occupying the minimum possible space, and thus paying for less leased space.

To this end a common practice of stacking servers in a shelf-like system has been developed. In this manner, multiple servers may occupy the floor space of a single server plus the space for the rack supporting it. Different stacking systems and rack supporting devices have been developed to minimize the floor space required for a stack of servers. For example, one system requires four posts to hold a stack of servers while another system requires only two posts to support the same stack of servers. However, the problem still exists that once all of the shelves in the stacking system are occupied there is no way to increase the number of servers without leasing more floor space at an increased cost.

It is, therefore, desirable to develop a technique whereby multiple servers may be contained within less space. Such a technique would decrease the overall floor space necessary for a large number of servers, thereby lowering the cost for maintaining a group of servers either in a data warehouse storage facility or other similar facility.

SUMMARY OF THE INVENTION

In accordance with the present invention, these objectives are achieved by a technique whereby multiple servers are contained within a single server housing. The present invention is advantageous in that it saves space and reduces costs. For example, in accordance with an embodiment of the present invention two servers may be contained within the same chassis normally used to house a single server. Thus, in accordance with this exemplary embodiment, the present invention allows for twice the amount of server capacity within a given space. Therefore, in a rack-based system, wherein servers are housed in a rack-like shelving system, the present invention is able to maximize the number of servers occupying a given area of floor space by increasing the number of servers per unit of rack or shelf space.

In accordance with an embodiment of the present invention, the multiple servers contained within a single server housing utilize a number of features that provide utility and convenience for a user. For example, separate indicators associated with each server contained within each chassis are provided, such that a user may visually discern the status of each server contained within the server housing. Additionally, a specially designed cooling unit may be incorporated within the server housing of the present invention to allow for more efficient cooling in a smaller amount of space.

In accordance with a further embodiment of the present invention, the multiple servers contained within the single server housing may be connected by way of a crossover cable, thereby allowing a cluster software package to perform server administration jointly to each of the multiple servers.

In accordance with a further embodiment of the present invention, the multiple servers of the present invention may be connected to a remote access network such as the Internet. By way of such a network, the multiple servers of the present invention may be accessed remotely, and a remote user or system administrator may reconfigure, or otherwise change the software of the multiple servers.

Further features of the present invention, and the advantages offered thereby, are explained in greater detail hereinafter with reference to specific embodiments illustrated in the accompanying drawings.

BRIEF DESCRIPTION OF THE DRAWINGS

FIG. 1 is a block diagram illustrating a conventional rack mounting system used with computer network application servers.

FIG. 1B is a block diagram of a footprint of a typical four post rack system that may be used for shelving computer network application servers.

FIG. 1C is a block diagram of a footprint of a two post rack mounting system that may be used for shelving computer network application servers.

DETAILED DESCRIPTION OF THE PREFERRED EMBODIMENTS

Figure 2:
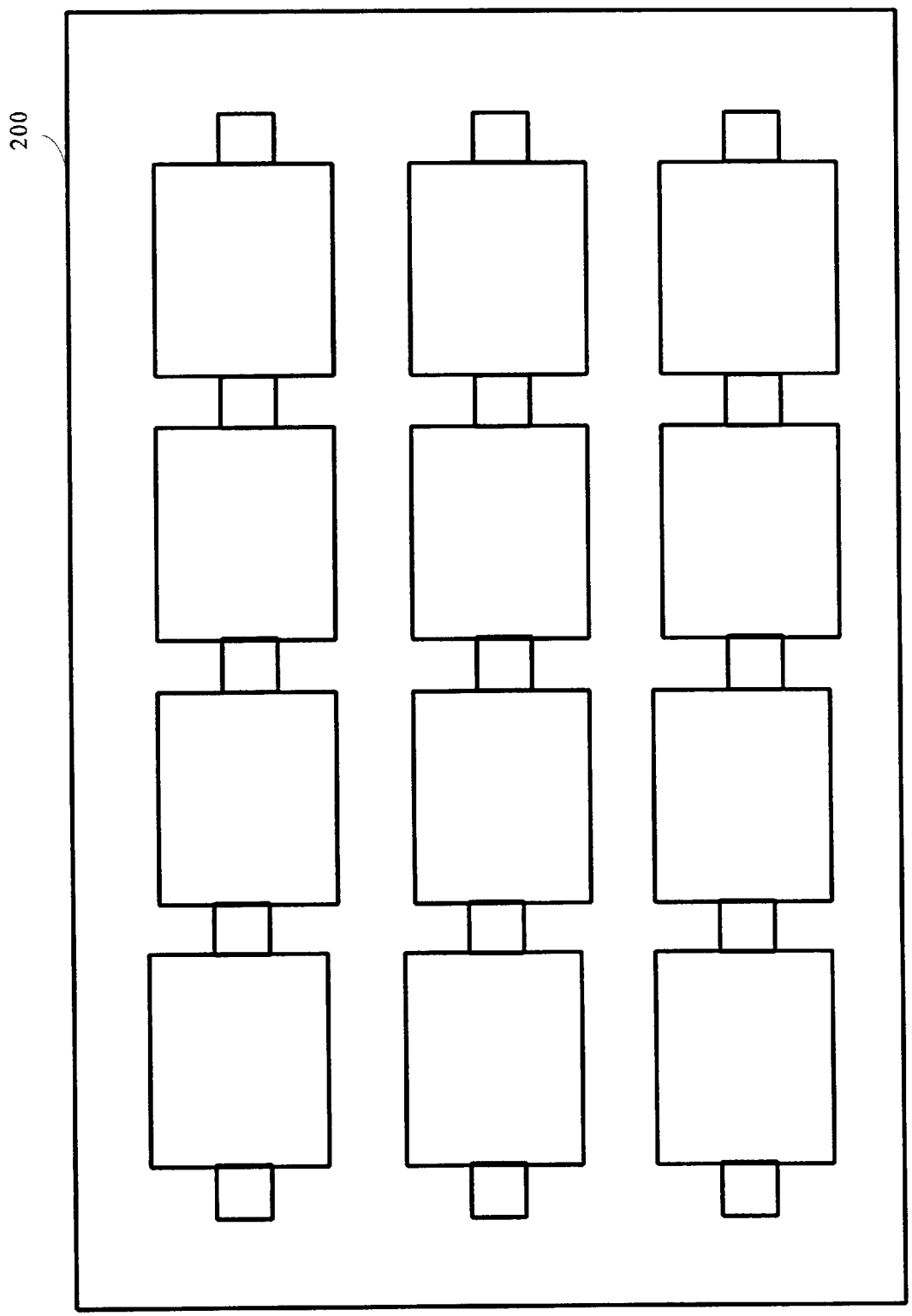
FIG. 2 is a block diagram illustrating a floor plan of the general layout of a computer network application server housing facility.

To facilitate an understanding of the principles and features of the present invention, it is explained hereinafter with reference to its implementation in an illustrative embodiment. In particular, the invention is described in the context of two servers contained within a single server chassis, and wherein both servers are maintained and administered remotely by way of a remote access network, such as an Ethernet network, or the like. It will be appreciated, however, that this is not the only embodiment in which the invention can be implemented. Rather, it can find utility in a variety of computer network configurations, as will become apparent from an understanding of principles which underscore the invention.

FIG. 1A is a block diagram of a conventional rack mounting system 100 for shelving computer network application servers. The rack mounting system 100 is illustrated in FIG. 1A as having three different groups, or stacks, of computer network application servers 102, 104, 106. However, the number of stacks contained within the rack mounting system 100 may be varied according to the available space, and the desire of the users or administrators of the servers. Each of the stacks of servers 102, 104, 106 are supported by either two or four posts each. For example, stack 102 is supported by posts 108 and 110, stack 104 is supported by posts 110 and 112, and stack 106 is supported by posts 112 and 114.

It can be readily seen in the view illustrated in FIG. 1A that the central stack, stack 104, contains more servers than either of the stacks to its sides, stacks 102 and 106. This is because each of the servers 116–130 supported within stack 104 have the narrowest profile, or form factor, of all of the servers illustrated in FIG. 1A. On the other hand, the servers contained within stacks 102 and 106 are of varying sizes. For example, the servers 132, 134, 136, 138 of stack 102 each have the narrow form factor of the servers contained within stack 104. However, server 140 has a larger form factor, and thus takes up more space than the servers having a narrower form factor. Additionally, a monitor 142 is supported within stack 102 for system administration purposes. The monitor 142 also takes up more space than the servers having the narrow form factor. While servers 144–148 of stack 106 each have a narrow form factor, two servers 150, 152 have a larger form factor requiring more space. Additionally, between the larger servers 150, 152 there is unused space.

Because the space used to house such servers as those illustrated in FIG. 1A generally costs a large amount of money, the most economically efficient configuration is a configuration illustrated in stack 104. Hence, if elements requiring more space than the servers illustrated in stack 104, such as monitors and servers having larger form factors can be eliminated, the economic efficiency of such a rack mounted storage system for servers may be maximized.

Typically, shelving systems, and rack managed storage systems have a measuring quantity called a "unit" (U). Each unit represents 1.75 inches in height. Thus, if each of the servers illustrated in stack 104 are 1U in height, the larger servers 140, 150, 152, would be 2U or 3.5 inches in height.

FIG. 1B is a block diagram of a top view of a four-post rack mounting system. In FIG. 1B four-posts 154, 156, 158, 160 are used to support a stack of servers, the top most of which is shown as the server 162 in FIG. 1B. As can be seen from FIG. 1B, this four-post rack mounting system requires a footprint that is much larger than the server stack alone, and is thus somewhat space inefficient.

An alternative, two-post rack mounting system is illustrated in FIG. 1C. In the two-post rack mounting system of FIG. 1C, two posts 164, 166 are used to support a stack of servers, the top most of which is illustrated as the server 168 in FIG. 1C. This two-post rack mounting system is somewhat more space efficient than the four-post rack mounting system illustrated in FIG. 1B. This is because it requires a smaller footprint, or amount of floor space, to support the same number of servers supported by the four-post mounting system.

Either the two-post or four-post rack mounting system could be used in the manner illustrated in FIG. 1A to support multiple servers stacked with one on top of another. Thus, the posts 108, 110, 112, 114 illustrated in FIG. 1A may correspond to single posts, as in the case of the two post rack mounting system illustrated in FIG. 1C, or may correspond to a pair of posts wherein the posts to the rear of FIG. 1A are obscured from view by the front-most posts, such as with a four post rack mounting system of the type illustrated in FIG. 1B.

FIG. 2 is a block diagram illustrating the general layout of a small space 200 allocated to a group of server stacks. This space 200 may be contained, for example, within a data warehousing facility, or within the facilities of an internet service provider or the like. As can be seen in FIG. 2, a two post rack mounting system is used to maximize the number of servers that can be contained within a given space given 200. Three rows of server stacks are viewed from the top within space 200, allowing for aisles between each of the rows, and space along the perimeter of each of the server stacks. Assuming that each of the stacks contained within the space 200 contain the maximum number of 1U servers corresponding to stack 104 of FIG. 1A, then the maximum number of servers that can be contained within this layout within space 200 is 96. If, however, the maximum number of 1U servers that can be contained within a stack exceeds that of stack 104 of FIG. 1A, then for each new server added to every stack, the layout shown in space 200 would contain 12 more servers. This number is dependent upon the height of the ceiling within the space 200 in FIG. 2, and will vary greatly.

In accordance with an embodiment of the present invention, a technique is provided whereby many more servers may be contained within space 200 of FIG. 2, or within any layout within a confined space such as space 200 in FIG. 2. This is accomplished by providing for multiple servers to be contained within each of the conventional server housings. In this manner, regardless of the size of the server housing, or chassis, at least twice as many servers can be contained within the same space originally containing only one server. This achieves the highest server density when 1U server housings are used. If, for example, the number of 1U server housings shown in stack 104 of FIG. 1A is used in each of the stacks illustrated in the space 200 of FIG. 2, then the number of servers that may be contained within the space 200 is 96. However, if the number of servers contained within each of the server housings is doubled, then the number of servers that may be contained within the space 200 would also double and 192 servers could be contained within the space 200. As more servers are contained within each of the server housings increases, the total number of servers that can be contained within the limited area of the space 200 shown in FIG. 2 also increases. As the total number of servers that can be contained within the space 200 increases, the cost-per-server ratio of leasing the space 200 is minimized.

Figure 3:
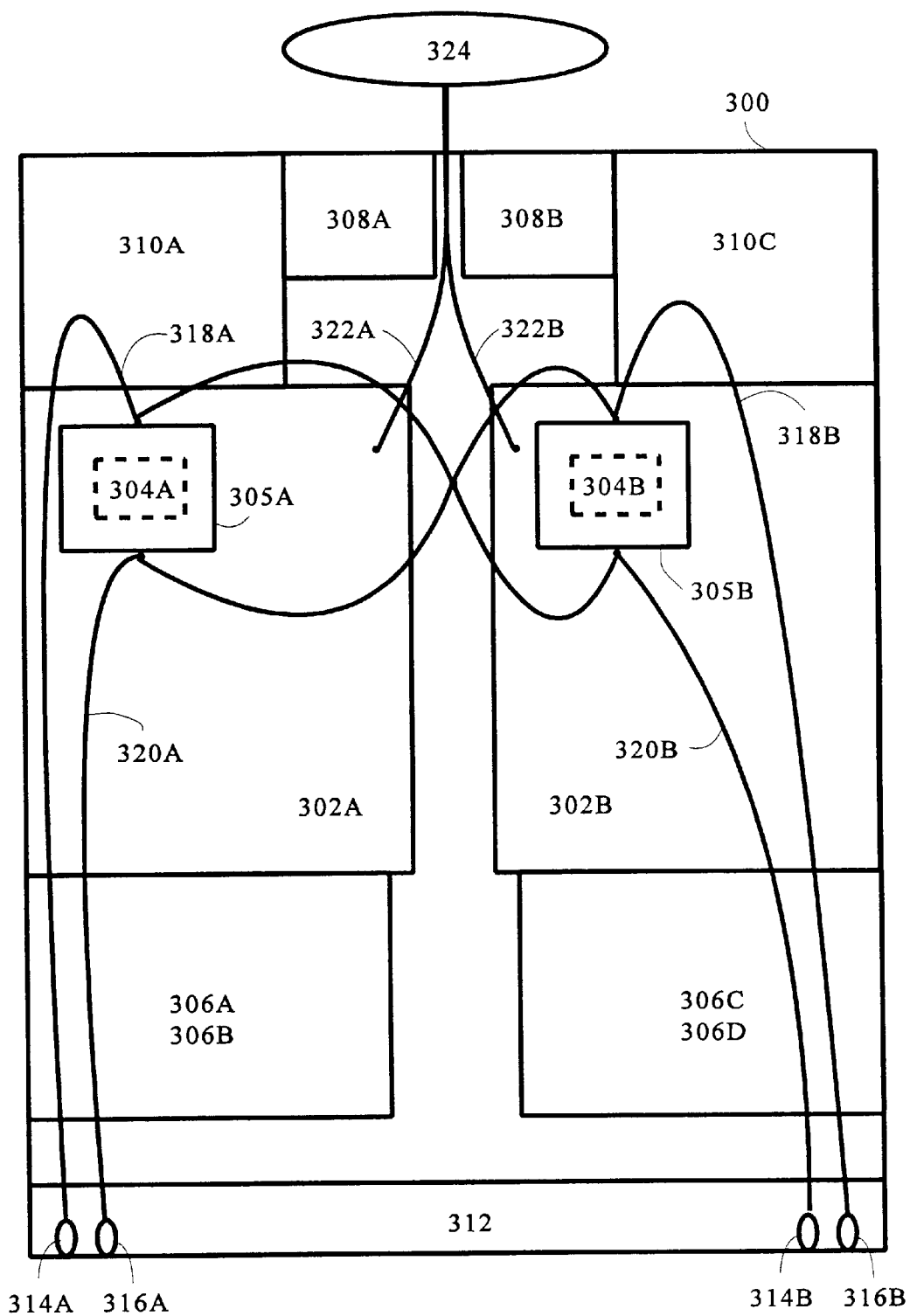
FIG. 3 is a block diagram of an embodiment of the present invention.

FIG. 3 is a block diagram of an embodiment of the present invention wherein two servers are contained within a single server housing, or chassis. The server housing 300 used to contain two servers in FIG. 3 may be of varying height. To maximize the number of servers that may be contained in a stack, such as the stack 104 illustrated in FIG. 1A, a server housing 300 having a height of a 1U form factor may be used.

The layout of the dual servers illustrated in housing 300 of FIG. 3 is significantly different from the conventional single-server-per-housing layout. For the sake of convenience, like elements of each server are numbered with the same number and differ only in the final letter of the designations.

Each of the servers contained in the server housing 300 include a motherboard 302A, 302B. Connected to each motherboard is a central processing unit (CPU) 304A, 304B. This CPU may be any processor suitable for carrying out the functions of a network application server. Each of the CPUs 304A, 304B is cooled by a fan/heat sink combination 305A, 305B which is disposed on top of the CPU to which it is thermally coupled. The fan 305A, 305B is used to disperse heat from the CPU 304A, 304B, and prevent overheating. Each server contains a group of hard drives. In housing 300 of FIG. 3, each server has hard drive storage units. These hard drive storage units may be contained within groups. For example, in the embodiment illustrated in FIG. 3, each server has a group of two hard drives 306A, 306B, 306C, 306D. These hard drives may be capable of being removed and inserted during operation, that is the hard drives 306A, 306B, 306C, 306D may be hot-swappable. The space allocated for the hard drives 306A, 306B, 306C, 306D within server housing 300 could also be occupied by another suitable storage device or group of storage devices, whereupon large amounts of data could be maintained. One purpose for having dual hard drives for each server is to maintain redundancy, whereby if one hard drive loses functionality, the server may continue operation, and the hard drive which lost functionality may be rebuilt using the other hard drive. The number of hard drives could increase as the size of the chassis increases, or as the size of such drives decreases. For additional storage, each server also has access to a removable storage medium. In housing 300, one possibility is illustrated, wherein each server has a floppy disk drive 308A, 308B. It should be recognized, however, that a variety of suitable storage media could be used instead of floppy disk drives. For example, an optical storage medium, such as a CD ROM could be used, or another magnetic storage medium could be used, such as a ZIP® drive or a JAZZ® drive, both available from Iomega Corp. of Utah, for example.

Situated next to the removable storage media 308A, 308B, are power supplies 310A, 310B. These power supplies have been situated at the rear of housing 300 to allow for maximum cooling within the housing 300. These positions of the power supplies 310A, 310B allow for air currents produced by the fans 305A, 305B contained on motherboards 302A, 302B to be drawn across them as they exit the rear of the housing 300. This airflow aids in cooling the power supplies 310A, 310B, and in drawing heat away from the motherboards 302A, 302B.

If floppy disk drives are used as the removable storage devices 308A, 308B, a particular type of floppy disk may be used to allow for remote access and reconfiguration of each of the servers within the housing 300. Specifically, a self-retracting or retractable disk drive can be used as the storage device 308A, 308B. A retractable disk drive is available from Sony Corporation, which allows a disk to be ejected and retracted into the storage device. Two versions of this retractable disk drive are currently available. First, a small computer system interface (SCSI) type retractable disk drive is available. This type of retractable disk drive is advantageous in that it allows addressability. Second, a retractable disk drive using the AT attachment interface, or a integrated device electronics (IDE) interface may also be used. Using such a retractable disk drive is particularly advantageous in that it allows remote loading and execution of software contained on a removable floppy disk. In a dual server situation, such as the one illustrated in FIG. 3, when one server malfunctions or otherwise fails, it is desirable to make repairs to or rebuild that server without having to take the entire housing, and consequently the other server contained therein, offline. Hence, a floppy disk containing commands necessary to repair, or rebuild a server may be maintained within the disk drive 308A, 308B, and may be remotely retracted by the server prior to restart. Thus, when the individual server restarts with the rebuild or repair floppy disk loaded in the floppy disk drive 308A, 308B, that server may be rebuilt or repaired. Thus, a single server contained within a dual server housing may be reconfigured or rebuilt, without interfering with the operation of the other server contained within the same housing 300. This remote reconfiguration or repair may also be executed whenever desired by a remote user or system administrator, and need not limit itself to times when a server has failed, or otherwise requires repair.

The server housing 300 has an instrument panel 312 disposed on the front of the housing 300 for indicating the status of each server, and a series of light emitting diodes LED may be disposed upon the front instrument panel 312, housing 300. In FIG. 3, two such status indicator LEDs 314A, 314B, 316A, 316B, are shown for each server contained within housing 300. These two LEDs are shown as connected to the fans 305A, 305B contained on the motherboards 302A, 302B, and are connected by way of wires 318A, 318B, 320A, 320B. In accordance with the embodiment of the present invention illustrated in FIG. 3, the LED indicators 314A, 314B, 316A, 316B are used to indicate problems associated with the fans 305A, 305B. For example, if the fan is operating correctly, one of the LEDs 314A, 314B could be turned on, and could be a distinguishing color, such as green, to indicate there are no problems associated with fans 305A, 305B. If, however, the fans cease to operate correctly, thereby endangering the CPUs 304A, 304B, then the LED indicators 316A, 316B could be turned on, and could have a color which is different from the status indicators 314A, 314B, such as red, for example.

In this manner, a system administrator or a user is able to discern quickly whether or not each server is operating correctly by way of the instrument panel 312. Additionally, when a problem arises with one of the servers, the user is able to distinguish which server has a problem associated with it and may take steps to remedy this problem without interrupting the operation of the other server(s) contained in the same housing. It should be recognized, however, that multiple LED indicators could be used for a variety of different purposes. The two LED indicators illustrated in FIG. 3 are only exemplary for indicating the status of one particular aspect of the servers contained within the housing 300. Additional LED indicators could be connected to other parts of the servers contained within housing 300, such as the storage devices, or power supplies, for example, or could be connected to additional monitoring devices, such as thermistors, or other similar sensing devices, to monitor conditions within housing 300 associated with the various servers contained therein.

The servers contained within the housing 300 are connected to an external network 324 by way of connections 322A, 322B. In an exemplary embodiment of the present invention, the network 324 to which the motherboards 302A, 302B are connected by way of the network connections 322A, 322B may comprise a local area network (LAN), and Ethernet type network, or the like. Additionally, by way of the network connections 322A, 322B, the servers contained within the housing 300 may be connected to other external networks, such as the internet, a wide area network (WAN), or the like. The network connections 322A, 322B may comprise a variety of different connections. For example, the network connections 322A, 322B may comprise standard wiring used for connection to networks, or may comprise wireless connection devices, such as an infrared (IR) transmitter and receiver, a radio transceiver, or the like. Additionally, the network connections 322A, 322B may comprise a hybrid of various connection types. For example, a combination of wiring and a wireless scheme could be used to connect network 324. It is by way of the network 324 that the servers within the housing 300 may be remotely monitored, maintained, and reconfigured.

The servers contained within the housing 300 in FIG. 3 are connected to network 324, and may be administered to via a cluster software package that is designed to operate with multiple servers at a single time. In such a configuration, and in accordance with an embodiment of the present invention, the servers being accessed by way of cluster-type software are connected together within the housing 300 by way of crossover cables to allow the cluster software to readily access both servers and allow both servers contained within the same housing to communicate with each other.

In order to reduce space, a user may desire the housing 300 illustrated in FIG. 3 to be as small as possible, or to have the smallest form factor possible. In order to fit all of the components necessary for the operation of multiple servers within a single housing having a form factor of 1U, or having a height of 1.75 inches, various improvements can be made to components contained therein. One example of such improvements are the improvements associated with the fan/heat sink combination 305A, 305B illustrated in FIG. 3.

Figure 4A:
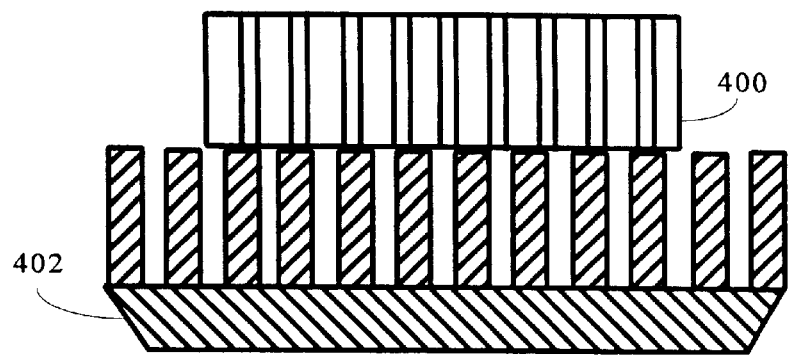
FIG. 4A is a block diagram illustrating a cooling unit used in connection with an embodiment of the present invention.

Traditionally, a fan unit 400 must be placed on top of a heat sink element 402, as illustrated in FIG. 4A. The heat sink element is then placed on top of the processor, such as CPU 304A, 304B illustrated in FIG. 3. This allows the heat sink to draw heat away from the processor, while the fan blows cool air over the heat sink elements, allowing for thermal transfer to take place that cools the heat sink element 402. Normally, when only a single server is contained within a server housing, the amount of heat dissipation provided by such a configuration as that illustrated in FIG. 4A is not necessary. However, as more and more processors and power supplies are added within the same server housing, significantly more heat must be dissipated in order to maintain the optimum operating temperature of the CPUs. This problem is compounded by reducing the housing size used to house multiple servers.

Figure 4B:
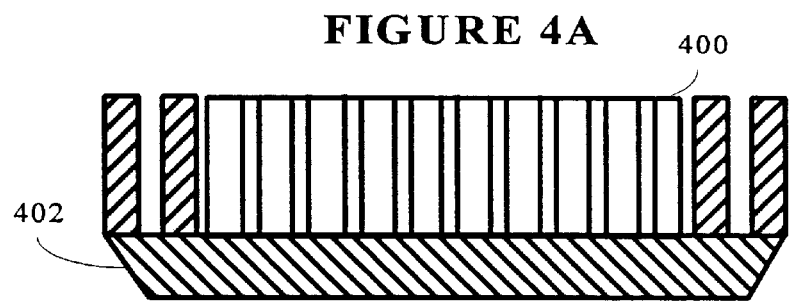
FIG. 4B is a block diagram of a cooling unit used in connection with an embodiment of the present invention.

In accordance with an embodiment of the present invention, the problem of dissipating significant amounts of heat using a larger fan and heat sink combination, and fitting that combination within a housing having a form factor of 1U is solved by the fan/heat sink element combination illustrated in FIG. 4B. In FIG. 4B, several prongs of the heat sink element 402 have been removed to allow the fan to be contained within the height of the heat sink element 402. This combination fan/heat sink element may then be mounted using a zero insertion force (ZIF) mounting on the processor, such as the CPUs 304A, 304B. In accordance with an embodiment of the present invention, the total height of the fan/heat sink element combination is approximately 1.4 inches, which allows such a combination to be mounted on top of the processors within a housing having a form factor of 1U and a total height of 1.75 inches. As can be seen in FIG. 4B, the top of the fan 400 is flush with the top of the heat sink element 402.

The slits in the sides of the fan unit 400 serve to pull air through the fins of the heat sink element 402, providing further cooling. In this manner, air may be pulled in through the sides of the fan unit 400 and expelled through the top of the fan unit. To further aid cooling, a hole, or combination of holes, may be placed in the top of the server housing to allow the warm air expelled by the fan to exit the housing. In accordance with one embodiment of the invention, holes in the housing may be placed directly above each of the fans, such as fans 305A, 305B, shown in FIG. 3.

Figure 4C:
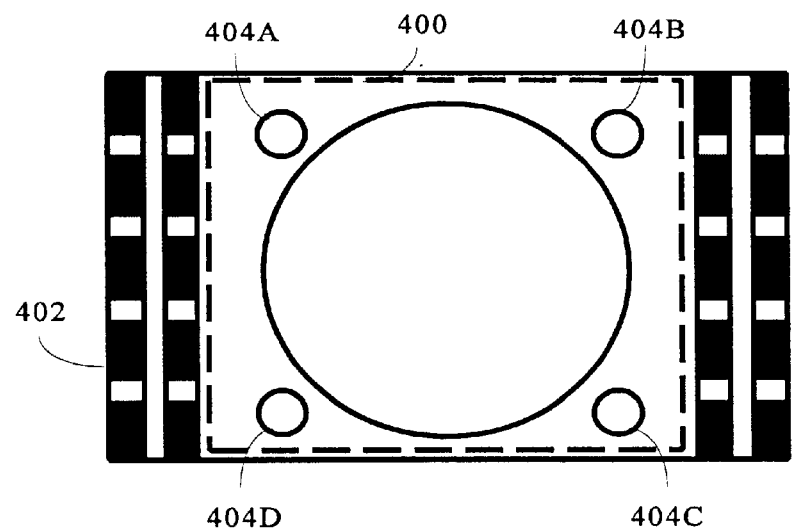
FIG. 4C is a block diagram of a cooling unit used in connection with an embodiment of the present invention.

FIG. 4C is an illustration of the top view of the fan/heat sink element combination illustrated in FIG. 4B. From this view, it is apparent that the fan is mounted by way of four identical mounting brackets 404A, 404B, 404C, 404D. Additionally, the fan is the same width as the heat sink element 402. This fact, coupled with the matched height of the fan 400 and the heat sink element 402 saves space for other elements contained within the server housing, such as the server housing 300 illustrated in FIG. 3.

Figure 4D:
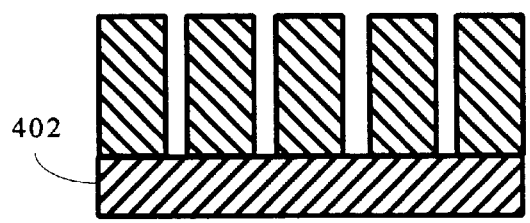
FIG. 4D is a side view of the cooling element.

FIG. 4D illustrates a side view of the cooling element 402, at a 90° viewing angle to the view illustrated in FIG. 4B. In this view, it can be seen that the sides of the heat sink element 402 are slotted. The fan, in the view illustrated in FIG. 4D is obscured by the heat sink element 402. The slots on the side of heat sink element 402 help to provide maximum cooling in a minimum amount of space.

By the foregoing, it can be seen that the present invention provides a technique whereby multiple servers may be contained within the chassis of a single server. In accordance with one embodiment of the present invention, two servers have been illustrated within a single server housing. These two servers have various improvements made to them whereby they may be remotely controlled, monitored, and reconfigured, and whereby the extra heat dissipated by having two servers in the space of one may be properly dissipated. Additionally, a means whereby status of each of the servers contained within the housing is provided.

It will be appreciated by those of ordinary skill in the art that the present invention can be embodied in other specific forms without departing from the spirit or central characteristics thereof. For example, the invention has been described in the context of two servers contained within a single housing. However, multiple servers could be contained within the same server housing, by utilizing the principles of the present invention. For example, two sets of dual servers, such as those illustrated in FIG. 3, could be stacked one on top of another within a single server housing having a form factor of 2U. Also, as components become smaller, more servers may be contained within smaller spaces. Additionally, multiple status indicators, aside from those discussed in connection with one embodiment of the present invention could be provided to indicate the operating status of various components of each of the servers, or ambient conditions within the housing.

The presently disclosed embodiments are, therefore, considered in all respects to be illustrative and not restrictive. The scope of the invention is illustrated in the appended claims, rather than the foregoing description, and all of the changes that come within the meaning and range of the equivalents thereof are intended to be embraced therein.

What is claimed is:

1. A server unit having the functionality of multiple computer application servers, wherein the server unit comprises:

a power supply for each of the multiple computer application servers contained within the server unit;

a removable disk drive for each of the multiple computer application servers contained within the server unit;

a motherboard for each of the multiple computer application servers contained within the server unit;

a computer processing unit (CPU) disposed on the motherboard of each of the multiple computer application servers;

at least one hard drive associated with each of the computer application servers contained within the server unit; and a network connection for each of the multiple computer application servers to connect the motherboard of each of the multiple computer application servers to a network external to the server unit.

2. The server unit of claim 1, wherein the server unit has the functionality of two computer application servers.

3. The server unit of claim 1, wherein said at least one hard drive associated with each of the computer application servers contained within the server unit comprises two hard drives.

4. The server unit of claim 1, wherein said computer processing unit is coupled to a fan and a heat dissipation unit.

5. The server unit of claim 1, wherein the plurality of hard drives comprise a plurality of hot-swappable hard drives.

6. The server unit of claim 1, further comprising a plurality of light emitting diode (LED) indicators.

7. The server unit of claim 1, wherein the power supply is located in the rear of the server unit, which is on the side of the motherboard of each server nearest the CPU contained thereon, to allow for greater heat dissipation capacity.

8. The server unit of claim 1, wherein the functionality of multiple computer application servers is controlled remotely by way of a server clustering software package.

9. The server unit of claim 1, wherein the floppy disk drives comprise retractable floppy disk drives.

10. The server unit of claim 1, wherein the server unit is connected to a network by way of network connections from each of the multiple computer application servers.

11. The server unit of claim 4, wherein the fan is contained within a recessed portion of the heat dissipation element.

12. The server unit of claim 4, wherein the fan and heat dissipation element are connected to the computer processing unit by way of a zero insertion force mounting.

13. The server unit of claim 4, wherein the server unit has at least one hole in the topmost side, opposite the side upon which the motherboard is supported.

14. The server unit of claim 8, wherein the multiple computer application servers contained within the server unit are connected by way of a crossover cable.

15. The server unit of claim 10, wherein the server unit is controlled remotely for the purposes of monitoring, maintenance, and reconfiguration.

16. The server unit of claim 13, wherein the server unit has two holes disposed directly above the fan.

* * * * *